(12) United States Patent
Seymour

(10) Patent No.: US 9,310,198 B2
(45) Date of Patent: Apr. 12, 2016

(54) THREE-DIMENSIONAL LOCATION OF TARGET LAND AREA BY MERGING IMAGES CAPTURED BY TWO SATELLITE-BASED SENSORS

(75) Inventor: Michael Seymour, Labastide Beauvoir (FR)

(73) Assignee: AIRBUS DS SAS, Elancourt (FR)

( * ) Notice: Subject to any disclaimer, the term of this patent is extended or adjusted under 35 U.S.C. 154(b) by 1005 days.

(21) Appl. No.: 13/496,518

(22) PCT Filed: Sep. 9, 2010

(86) PCT No.: PCT/EP2010/063260
§ 371 (c)(1),
(2), (4) Date: May 16, 2012

(87) PCT Pub. No.: WO2011/032884
PCT Pub. Date: Mar. 24, 2011

(65) Prior Publication Data
US 2012/0226470 A1 Sep. 6, 2012

(30) Foreign Application Priority Data

Sep. 18, 2009 (FR) ...................................... 09 56429

(51) Int. Cl.
| | |
|---|---|
| G01S 13/89 | (2006.01) |
| G01C 11/02 | (2006.01) |
| G01S 13/90 | (2006.01) |
| G01S 13/86 | (2006.01) |

(52) U.S. Cl.
CPC .............. *G01C 11/02* (2013.01); *G01S 13/867* (2013.01); *G01S 13/90* (2013.01)

(58) Field of Classification Search
CPC ...... G01C 11/02; G06T 7/0026; G01S 13/867
USPC .......................... 342/25 R–25 F, 59, 179, 191
See application file for complete search history.

(56) References Cited

U.S. PATENT DOCUMENTS 5,550,937 A * 8/1996 Bell ...................... G06T 3/0081
382/278
5,995,681 A * 11/1999 Lee ........................ G01C 11/02
356/139.03

(Continued)

OTHER PUBLICATIONS

Quo Zhang; Zhen Li; Hong-bo Pan; Qiang Qiang; Liang Zhai, "Orientation of Spaceborne SAR Stereo Pairs Employing the RPC Adjustment Model," Geoscience and Remote Sensing, IEEE Transactions on , vol. 49, No. 7, pp. 2782,2792, Jul. 2011.*

(Continued)

*Primary Examiner* — John B Sotomayor
*Assistant Examiner* — Marcus Windrich
(74) *Attorney, Agent, or Firm* — Jerold I. Schneider; Schneider Rothman Intellectual Property Law Group, PLLC

(57) ABSTRACT

Target land area is three-dimensionally located using an optical sensor and a radar sensor in satellites. The positions of the satellites are measured and images are captured when the sensors point toward land areas. The aiming direction of the optical sensor for each area is measured. The distance between each area and the radar sensor pointing thereto is measured. Images of land areas captured by the sensors and covering common areas are matched. The distance between the target area selected from the common areas and the optical sensor is accurately determined on the basis of the positions of the sensors, the distance between the target area and the radar sensor, and the aiming direction of the optical sensor, which are associated with the images covering the target area.

6 Claims, 2 Drawing Sheets

(56) References Cited

U.S. PATENT DOCUMENTS

| | | | |
|---|---|---|---|
| 7,363,157 B1 | 4/2008 | Hanna et al. | |
| 7,437,062 B2* | 10/2008 | Holcomb | G01C 11/02 348/144 |
| 2010/0232728 A1* | 9/2010 | Leprince | G01C 11/02 382/294 |
| 2011/0043402 A1* | 2/2011 | Sasakawa | G01C 11/02 342/25 A |

OTHER PUBLICATIONS

Marechal, N., "A terrain elevation error model for stereometric SAR systems engineering," Signals, Systems and Computers, 2008 42nd Asilomar Conference on , vol., no., pp. 497,504, Oct. 26-29, 2008.*

Giros A et al: "On the Possibility of Automatic Multisensor Image Registration", IEEE Transactions on Geoscience and Remote Sensing, IEEE Service Center Piscataway, NJ, US LNKD-DOI:10.1109/TGRS 2004.835294, vol. 42, No. 10, Oct. 1, 2004, pp. 2104-2120 XP011120438.

Liao Mingsheng et al: "Precision rectification of airborne SAR Image", Geoscience and Remote Sensing, 1997. IGARSS '97, Remote Sensing—A Scientific Vision for Sustainable Developement, 1997, IEEE International Singapore Aug. 3-8, 1997, New York, NY, USA IEEE, US, vol. 1, Aug. 3, 1997, pp. 204-206, XP010234714.

* cited by examiner

THREE-DIMENSIONAL LOCATION OF TARGET LAND AREA BY MERGING IMAGES CAPTURED BY TWO SATELLITE-BASED SENSORS

CROSS-REFERENCE TO RELATED APPLICATIONS

This application is the entry into the U.S. of PCT Application Number PCT/EP2010/063260 filed Sep. 9, 2010, which claims priority to FR0956429, filed Sep. 18, 2009, the entirety of each of which is hereby incorporated by Reference.

BACKGROUND OF THE INVENTION (1) Field of the Invention

The present invention generally relates to spaceborne remote sensing of images, in particular for observing the earth. The invention relates more particularly to a method and a system for three-dimensional location of a target land area by merging images captured by two sensors having different radiometric properties, such as a radar sensor and an optical sensor, embedded on separate satellites.

Two different sensors produce different images of the same land scene being observed. If the images are processed separately, it is generally not possible to locate the pixels in the images accurately. It is necessary to resort to additional information in the form of a digital elevation model DEM, which is interpolated to find the location of each small target area for each image, using the technical features of each sensor.

Processing these images together after corrections of various distortions automatically results in the matching of homologous points in the two images, which are used to estimate an analytical deformation model based on a calculation of the degree of similarity and at least one interpolation for each pair of homologous points.

(2) Description of Related Art

In the article by Jordi Inglada and Alain Giros, "On the Possibility of Automatic Multisensor Image Registration", IEEE TRANSACTIONS ON GEOSCIENCE AND REMOTE SENSING, vol. 42, no. 10, pages 2104-2120, October 2004, chapter VII presents the estimation of a topography using an optical sensor and a radar sensor on the platforms of two different satellites pointed at a target point. The height h of the target point on the earth, which is considered to be flat, is given by the following formula:

$$h = \Delta x (\tan \alpha_1)/((\tan \alpha_1 \tan \alpha_2)+1)),$$

wherein $\alpha_1$ and $\alpha_2$ denote the angles of incidence of the target point viewed by the sensors in relation to the earth, and $\Delta x$ denotes the offset between images of the target point provided by the sensors. The offset $\Delta x$ is equal to the sum of the distance between the projection of the target point on the earth and the point of intersection of the line of sight of the optical sensor with the earth and the distance between the projection of the target point on the earth and the projection of the target point on the earth perpendicular to the line of sight of the radar sensor, assuming a planar wave front emitted by the radar sensor.

Such an estimation is not accurate enough to locate each small target area in the images three-dimensionally in order to record a three-dimensional topography of the scene. The radar sensor implicitly measures the distance between the phase center of the antenna and the target area. For this reason, the angle of incidence associated with the radar sensor cannot be measured accurately.

If the optical sensor and the radar sensor are embedded on the platform of a single satellite, that is to say $\alpha_1 = \alpha_2 = \alpha$, the previous formula is written as follows:

$$h = \Delta x (\tan \alpha)/((\tan \alpha)^2+1)), \text{ that is to say } h = \Delta x (\sin 2\alpha)/2.$$

In practice, the sensors will not be mounted so as to have an identical angle of incidence. There will always be a bias in the location calculation.

Each of these formulae means that the height h of the target point to be measured is proportional to the offset measured between the images of the target point and independent of the elevations of the sensors.

This trigonometric approach to merging data from an optical sensor and a radar sensor is also too simplistic. In order to have a three-dimensional position, other transformations linked to the positions and orientations of the sensors must be taken into account.

The object of the invention is to locate a target land area three-dimensionally with a greater precision by merging acquired data from an optical sensor and a radar sensor, as a function of the positions of the satellites carrying the sensors.

To achieve this object, a method for three-dimensional location of a target land area by means of an optical sensor and a radar sensor embedded respectively on satellites, comprising measuring the positions of the satellites when the sensors point at land areas, is characterized in that it comprises measuring a sight direction of the optical sensor and capturing an image of a land area for each of the measured positions of the optical sensor, measuring the distance between a land area and the radar sensor and capturing an image of the land area for each of the measured positions of the radar sensor, comparing the images captured by the optical sensor and the images captured by the radar sensor, matching the images of land areas captured by the optical and radar sensors and covering common land areas, and determining the distance between the target land area selected from the common land areas and the optical sensor as a function of the positions of the sensors, the distance between the target land area and the radar sensor, and the sight direction of the optical sensor, which are associated with the images captured by the optical and radar sensors covering the target land area.

The distance between the target land area and the optical sensor is thus determined as a function of simple data measured accurately, in particular on board co-located satellites, by an approach involving the merging of two equations relating to the sensors, without making approximations regarding the position of the satellites, allowing the position of the target land area viewed by the sensors to be provided with great accuracy.

BRIEF SUMMARY OF THE INVENTION

The invention can be used to establish a three-dimensional digital elevation model of the scene or for accurate cartographic projections from the recording of the images provided respectively by the satellites, using mutual criteria to harmonize the disparities between two images of the same target land area captured at a priori different instants by the sensors. In addition, the current use of only optical sensors, or radar sensors, of very high resolution and the need to produce high-quality digital elevation models justify the industrial use of the invention which, owing to the combination of data provided by an optical sensor and data provided by a radar sensor, is not very complex.

As will be seen below, determining the distance between the target land area and the optical sensor comprises solving a quadratic equation of this distance resulting from the combination of two equations linked to the sensors. Solving the quadratic equation comes down to determining the following two solutions of distance:

$$\delta = \vec{u}_O^T(\vec{p}_R - \vec{p}_O) \pm ([\vec{u}_O^T(\vec{p}_R - \vec{p}_O)]^2 - |\vec{p}_R - \vec{p}_O|^2 + d_R^2)^{1/2},$$

in which $\vec{p}_O$ and $\vec{p}_R$ denote the positions of the satellites embedding the optical sensor and the radar sensor, $d_R$ denotes the distance between the target land area and the radar sensor and $\vec{u}_O$ denotes the sight direction of the optical sensor towards the target land area, and
selecting the one of the two solutions of distance which is less than the radius of the earth.

The invention also relates to a system and a device for three-dimensional location of a target land area.

The system comprises an optical sensor and a radar sensor embedded respectively on satellites, a means for measuring positions of the satellite embedding the optical sensor when the optical sensor is capable of pointing at land areas, and a means for measuring positions of the satellite embedding the radar sensor when the radar sensor is capable of pointing at land areas. The system is characterized in that it comprises a means for measuring a sight direction of the optical sensor and capturing an image of a land area for each of the measured positions of the optical sensor, a means for measuring the distance between a land area and the radar sensor and capturing an image of the land area for each of the measured positions of the radar sensor, a means for comparing images captured by the optical sensor and images captured by the radar sensor, a means for matching images of land areas captured by the optical and radar sensors and covering common land areas, and a means for determining the distance between the target land area selected from the common land areas and the optical sensor as a function of the positions of the sensors, the distance between the target land area and the radar sensor, and the sight direction of the optical sensor, which are associated with the images captured by the optical and radar sensors covering the target land area.

The device is capable of receiving measured positions of satellites when an optical sensor and a radar sensor embedded respectively on satellites are capable of pointing at land areas, for locating a target land area three-dimensionally. The device is characterized in that it comprises a means for comparing images of land areas captured by the optical sensor and associated with measured positions and measured sight directions of the optical sensor and images of land areas captured by the radar sensor and associated with measured positions of the radar sensor and with measured distances from the radar sensor, a means for matching images of land areas captured by the optical and radar sensors and covering common land areas, and a means for determining the distance between the target land area selected from the common land areas and the optical sensor as a function of the positions of the sensors, the distance between the target land area and the radar sensor, and the sight direction of the optical sensor, which are associated with the images captured by the optical and radar sensors covering the target land area.

BRIEF DESCRIPTION OF THE DRAWINGS

Further features and advantages of the present invention will become clearer upon reading the following description of a plurality of embodiments of the invention given as non-limiting examples, with reference to the corresponding appended drawings, in which.

DETAILED DESCRIPTION OF THE INVETION

Figure 1:
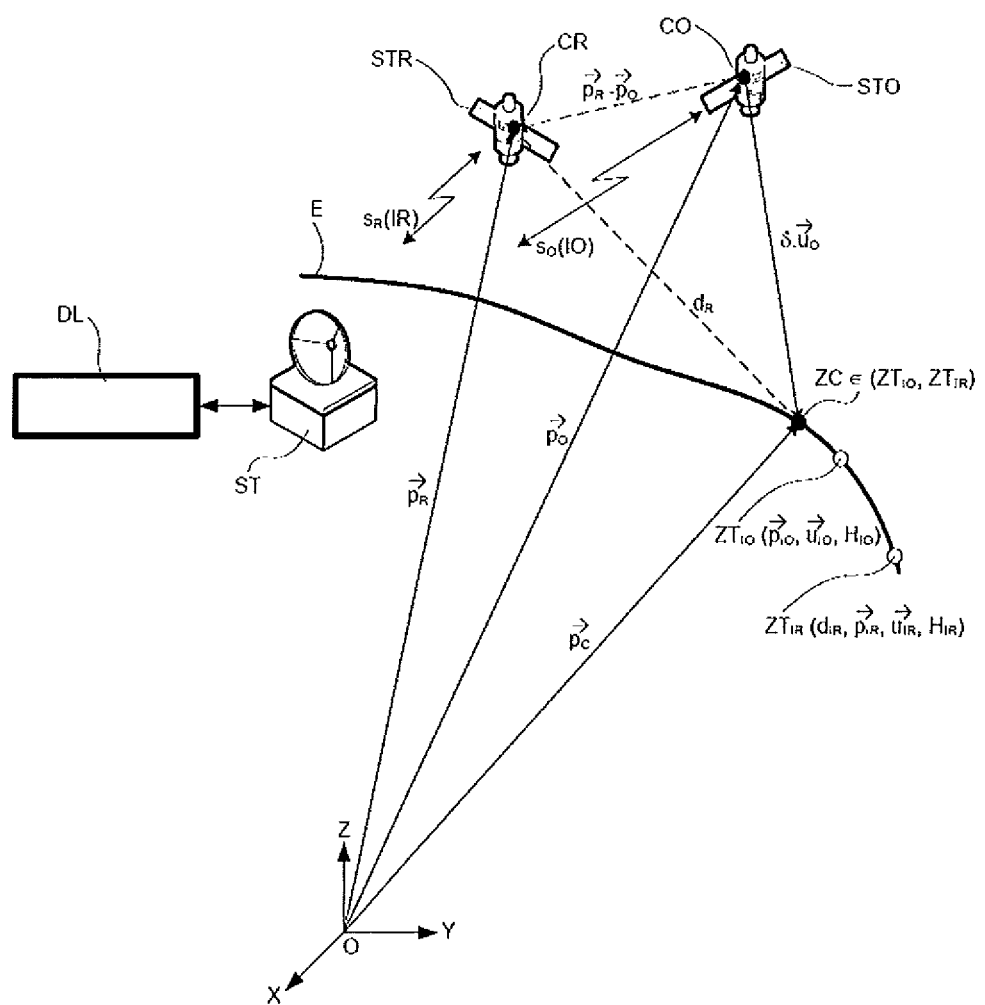
FIG. 1 shows schematically a system for a three-dimensional location of a target land area according to the invention.

With reference to FIG. 1, a system for a three-dimensional location of a target land area comprises an optical sensor CO, a radar sensor CR and a device DL for a three-dimensional location of a land area. The optical sensor CO is carried on the platform of a first satellite STO. The optical sensor comprises an internal imaging system having a matrix of charge-coupled photodetectors CCD situated in the focal plane of an optical system, the line of sight of which has a directionin relation to the earth which can be measured by means for measuring a sight direction, here the sensor, and an analog and digital electronic part for reproducing and storing two-dimensional images. The radar sensor CR is a synthetic aperture imaging radar SAR carried on the platform of a second satellite STR. The device DL may comprise for example a computer situated on the ground and for example connected to or integrated in at least one land station ST for multi-satellite tracking in communication with the satellites STO and STR and synchronous with the satellite clocks.

The optical sensor CO and the radar sensor CR transmit signals $s_O$ and $s_R$ which are relayed by the station ST to the device DL in order for the station to periodically acquire various digital data transmitted by the satellites, such as geographical positions of the satellites measured thereby with timestamp data. The signals $s_O$ and $s_R$ can carry at a priori different instants respectively an optical image IO and a radar image IR with their respective dates, each covering a target land area ZC. The instants of capturing the optical image and the radar image may differ by a few hours, days or months. Each sensor stores images of respective land areas and retransmits them in a conventional manner with data of the sensor and of the satellite embedding the sensor to the device DL via the station ST when said station is directly exposed to the satellite antenna in order for the device DL to record the data and subsequently process it according to the invention.

The target land area ZC is very small compared to the surface of the earth E. For example, the area ZC has a diameter of a few meters and is located by its central point on the surface of the earth. The area ZC is to be located by the device DL in relation to a three-dimensional frame of reference OXYZ which is for example fixed and linked to the earth and of which the origin O is at the center of the earth. In the frame of reference OXYZ, the sought position of the target area ZC is defined by a position vector $\vec{p}_C(p_C(X), p_C(Y), p_C(Z))$, the position of the satellite-based optical sensor CO is defined by a position vector $\vec{p}_O(p_O(X), p_O(Y), p_o(Z))$ when the sensor CO points at the target area ZC, and the position of the satellite-based radar sensor CR is defined by a position vector $\vec{p}_R(p_R(X), p_R(Y), p_R(Z))$, when the sensor CR points at the target area ZC.

In relation to the optical sensor CO, the position vector $\vec{p}_C$ of the target land area ZC depends on the position vector $\vec{p}_O$ of the optical sensor CO, on coordinates x and y of the target area ZC in a frame of reference situated on the focal plane of the internal optical system of the optical sensor CO, on the focal distance f of the optical system, on a matrix of rotation R and on a scale factor k, in accordance with the following vector equation:

$$\vec{p}_C = \vec{p}_O + kR \begin{bmatrix} x \\ y \\ -f \end{bmatrix}, \quad (1)$$

which can be written:

$$\begin{bmatrix} x \\ y \\ -f \end{bmatrix} = R^{-1}(\vec{p}_C - \vec{p}_O)/k. \quad (2)$$

The matrix of rotation R transforms the coordinates of a direction vector in the focal plane into the coordinates of this direction vector in the frame of reference OXYZ linked to the earth E:

$$R^{-1} = \begin{bmatrix} r_{11} & r_{21} & r_{13} \\ r_{12} & r_{22} & r_{23} \\ r_{13} & r_{23} & r_{33} \end{bmatrix}.$$

The coefficients $r_{11}$ to $r_{33}$ of the matrix of rotation R depend in particular on the orientation of the platform carrying the optical sensor CO in the satellite STO, on the position and the orientation of rotating mirrors on the optical path in the optical system, and on the orientation of the optical sensor in relation to the receivers in the tracking station ST connected to the locating device DL and hence in relation to the fixed frame of reference OXYZ.

The solution of the three collinearity equations deduced from the vector equation (2) leads to the coordinates x and y of the target area ZC as a function of the focal distance f and of the differences between the coordinates of the position $\vec{p}_C$ ($p_C(X), p_C(Y), p_C(Z)$) of the target area ZC and of the position $\vec{p}_O$ ($p_O(X), p_O(Y), p_O(Z)$) of the optical sensor CO, after substitution of the factor k deduced from the third collinearity equation in the first two collinearity equations:

$$x = -f \frac{r_{11}[p_C(X) - p_O(X)] + r_{21}[p_C(Y) + p_O(Y)] + r_{31}[p_C(Z) - p_O(Z)]}{r_{13}[p_C(X) - p_O(X)] + r_{23}[p_C(Y) - p_O(Y)] + r_{33}[p_C(Z) - p_O(Z)]} \quad (3)$$

$$y = -f \frac{r_{12}[p_C(X) - p_O(X)] + r_{22}[p_C(Y) + p_O(Y)] + r_{32}[p_C(Z) - p_O(Z)]}{r_{13}[p_C(X) - p_O(X)] + r_{23}[p_C(Y) - p_O(Y)] + r_{33}[p_C(Z) - p_O(Z)]}. \quad (4)$$

For a single optical image, equations (3) and (4), which define the coordinates x and y of the target area viewed by the optical sensor CO dependent on the properties of the optical sensor, cannot be solved without recourse to an elevation model DEM of the surface of the earth E.

The vector equation (1) can be written differently according to the following equation (5) in which the position of the target area ZC is expressed as a function of the distance 5 in meters between the target area ZC and the optical sensor CO and of a unit vector $\vec{u}_O$ in the sight direction from the optical sensor towards the target area in the frame of reference OXYZ:

$$\vec{p}_C = \vec{p}_O + \delta \vec{u}_O \quad (5).$$

In relation to the radar sensor CR having a known position vector $\vec{p}_R$ and situated at a distance $d_R$ from the target land area ZC deduced by means for measuring the distance $d_r$, here the radar sensor CR, from the radar echo returns received by the radar sensor CR, the position vector $\vec{p}_C$ of the target area is deduced from a first geometric equation in the frame of reference OXYZ:

$$d_R = |\vec{p}_R - \vec{p}_C| \quad (6)$$

and from a second equation deduced from the Doppler frequency cone having the sensor CR as its apex and relative to the Doppler frequency $f_{dop}$ in Hertz of the satellite STR carrying the radar sensor CR and having the speed $\vec{v}_R$ in relation to the speed $\vec{v}_C$ of the target area ZC in the frame of reference OXYZ, for a radar wavelength λ in meters corresponding to the central frequency of the radar signals emitted by the radar sensor CR of the satellite STR towards the target area:

$$f_{dop} = \frac{2}{\lambda} \times \frac{(\vec{p}_R - \vec{p}_C)^T}{(\vec{p}_R - \vec{p}_C)} (\vec{v}_R - \vec{v}_C), \quad (7)$$

wherein T designates the matrix transposition operator.

Similarly to the two equations (3) and (4), equations (6) and (7) are ambiguous for a single radar image. External data in the form of a digital elevation model DEM of the observed scene around the target area are needed to solve completely equations (6) and (7), in which the coordinates x and y of the target area depend on the properties of the radar sensor, in order to locate the target area via its coordinates.

Thus, the three-dimensional geolocation of the target land area by each of the two systems of equations (3-4) and (6-7) is relatively complex, since it has recourse to a digital elevation model DEM which should be interpolated in order to locate the target area accurately. For each of these two systems of equations, this can be avoided by collecting two images of the target area by the same method, optical or radar, from a corresponding satellite equipped with an optical sensor or a radar sensor. In the case of a satellite having an optical sensor, the geolocation is referred to as stereogrammetry. In the case of a satellite having a radar sensor, the geolocation is referred to as radargrammetry and comes down to finding the intersection of two arcs in order to locate the target area three-dimensionally. With the appearance of global positioning systems (GPS) and in the case of satellites equipped with optical sensors, these difficulties are attenuated somewhat by modeling the orbit and the orientation of the optical sensors, leading to the possibility of automatic image processing without external control points.

According to the invention, the locating device DL merges data from the optical sensor CO in the first satellite STO and data from the radar sensor CR in the second satellite STR by replacing the position vector $\vec{p}_C$ of the target area in equation (6) by its value deduced from equation (5) in order to obtain the sought distance δ between the target area ZC and the optical sensor CO:

$$d_R = |\vec{p}_R - \vec{p}_O - \delta \vec{u}_O| \quad (8)$$

This equation represents the intersection of the vector $\vec{p}_R - \vec{p}_O - \delta \vec{u}_O$ with a sphere of radius $d_R$ centered on the radar sensor CR.

By squaring the two elements of equation (8) there is obtained:

$$d_R^2 = (\vec{p}_R - \vec{p}_O - \delta \vec{u}_O)^T (\vec{p}_R - \vec{p}_O - \delta \vec{u}_O)$$

and then merging the differences between the position vectors of the radar sensor and the optical sensor:

$$d_R^2 = (\vec{p}_R - \vec{p}_O)^T(\vec{p}_R - \vec{p}_O) - 2\delta \vec{u}_O^T(p_R - \vec{p}_O) + \delta^2 \vec{u}_O^T \vec{u}_O,$$

a second degree equation in $\delta$ is obtained:

$$\delta^2 - 2\vec{u}_O^T(\vec{p}_R - \vec{p}_O)\delta + (\vec{p}_R - \vec{p}_O)^T(\vec{p}_R - \vec{p}_O) - d_R^2 = 0,$$

the two solutions of which are:

$$\delta_1 = \vec{u}_O^T(\vec{p}_R - \vec{p}_O) + ([\vec{u}_O^T(\vec{p}_R - \vec{p}_O)]^2 - |\vec{p}_R - \vec{p}_O|^2 + d_R^2)^{1/2}$$

$$\delta_2 = \vec{u}_O^T(\vec{p}_R - \vec{p}_O) - ([\vec{u}_O^T(\vec{p}_R - \vec{p}_O)]^2 - |\vec{p}_R - \vec{p}_O|^2 + d_R^2)^{1/2} \quad (9).$$

Of the solutions $\delta_1$ and $\delta_2$, the one which is positive and less than the radius RE of the earth is the correct distance $\delta$ from the optical sensor CO to the target area ZC.

Figure 2:
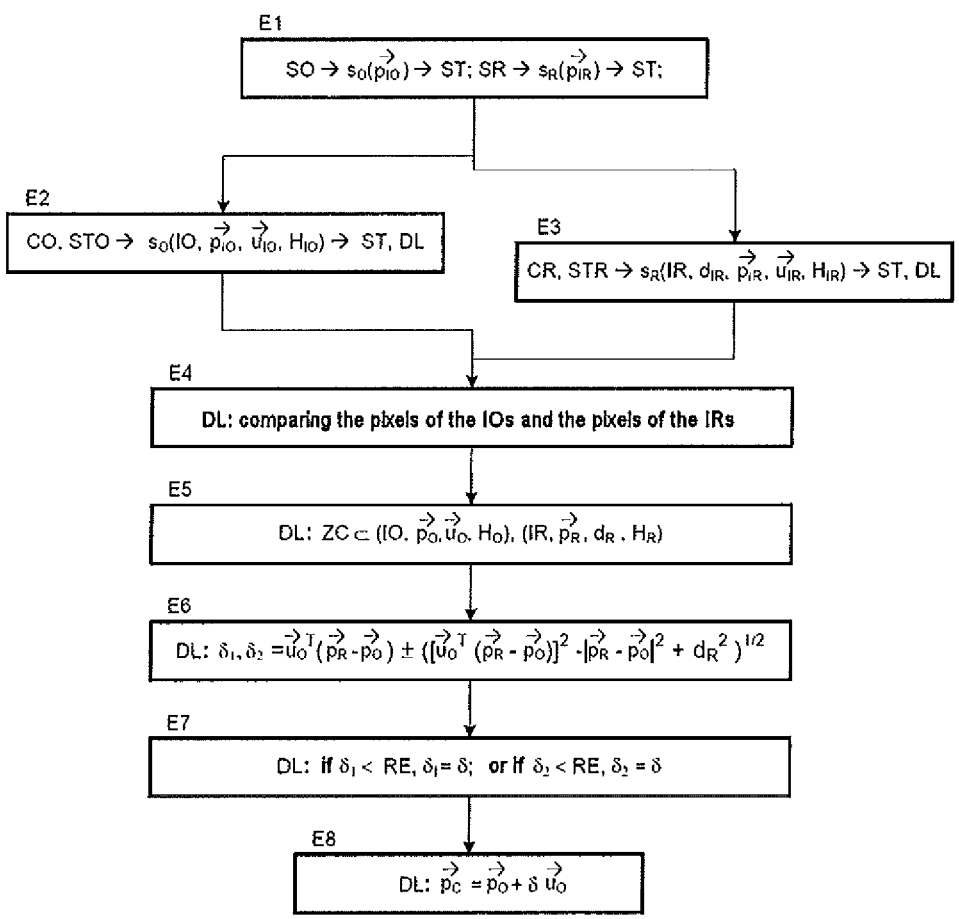
FIG. 2 is an algorithm of a method for a three-dimensional location of a target land area according to the invention.

With reference now to FIG. 2, the method for a three-dimensional location of a target land area according to the invention comprises steps E1 to E8 in order for the device DL to determine the distance $\delta$ between a target land area ZC and the optical sensor CO.

Firstly, at step E1, the tracking station ST periodically acquires various digital data carried by signals $s_O$ and $s_R$ which are emitted by the satellites and including in particular the geographical positions $\vec{p}_O$ and $\vec{p}_R$, of the satellites STO and STR, coincident with those of the sensors CO and CR, measured by means for measuring position, here the satellites in the fixed frame of reference OXYZ, when the optical sensor and the radar sensor point respectively at a priori different land areas. In a variant, the means for measuring the positions of the satellites STO and STR are the station ST in conjunction with beacons on the earth. At step E2, images IO of land areas $ZT_{IO}$ captured by the optical sensor CO and, in association with each of the captured images IO, in particular the measured position $\vec{p}_{IO}$ of the optical sensor CO, the measured sight direction $\vec{u}_{IO}$ of the optical sensor towards the land area $ZT_{IO}$ in the fixed frame of reference OXYZ and timestamp data $H_{IO}$ of the capturing of the image IO are transmitted via the signal $s_O$ by the satellite STO to the tracking station ST. The station ST retransmits each captured image IO with the data $\vec{p}_{IO}$, $\vec{u}_{IO}$ and $H_{IO}$ associated with the image IO to the device DL, which stores them in a database. Similarly, in step E3, which may come before or after step E2, the satellite STR transmits via the signal $s_R$ images IR of land areas $ZT_{IR}$ captured by the radar sensor CR and, in association with each of the captured images IR, in particular the distance $d_{IR}$ from the radar sensor to the earth E, the position $\vec{p}_{IR}$ of the radar sensor CR and the sight direction $\vec{u}_{IR}$ of the radar sensor towards the land area $ZT_{IR}$ in the frame of reference OXYZ and timestamp data $H_{IR}$ of the capturing of the image IR to the tracking station ST. The tracking station ST retransmits each captured image IR and the preceding data $d_{IR}$, $\vec{p}_{IR}$, $\vec{u}_{IR}$ and $H_{IR}$ associated with the image IR to the device DL, which stores them in the database. FIG. 1 shows a single land area $ZT_{IO}$ captured by the optical sensor CO and a single land area $ZT_{IR}$ captured by the radar sensor CR.

Means for comparing images, here the device DL classes the stored images IO and IR with their associated stored data such as $\vec{p}_{IO}$, $\vec{u}_{IO}$, and $d_{IR}$, $\vec{p}_{IR}$, $\vec{u}_{IR}$, $H_{IR}$ as a function of their timestamp data. The device DL analyses the images IO captured by the optical sensor and the images IR captured by the radar sensor and compares their pixels at step E4. Then, the means for matching images, here the computer, matches and stores images IO and IR of land areas $ZT_{IO}$ and $ZT_{IR}$ covering common land areas at step E5. An image IO and an image IR which are matched have in common at least a predetermined high number of pixels defining a common land area. The pixels which differ between the matched images IO and IR captured a priori at different instants $H_{IO}$ and $H_{IR}$ may result from changes to the common land area captured, such as a tree with leaves in summer and the same tree without leaves in winter, or such as a construction or a vehicle appearing in only one of the matched images. For two matched images IO and IR having in common a target land area ZC, selected from the common land areas, the device DL reads into memory their associated data $\vec{p}_O \equiv \vec{p}_{IO}$, $\vec{u}_O \equiv \vec{u}_{IO}$, $H_O \equiv H_{IO}$ and $d_R \equiv d_{IR}$, $\vec{p}_R \equiv \vec{p}_{IR}$, $\vec{u}_R \equiv \vec{u}_{IR}$, $H_R \equiv H_{IR}$. In particular, the device DL recognizes the sight direction $\vec{u}_O$ of the optical sensor CO and the sight direction $\vec{u}_R$ of the radar sensor CR when the sensors point at the target land area ZC at instants $H_{IO}$ and $H_{IR}$.

Then, at step E6, the means for determining the distance, here device DL determines the solutions of distance $\delta_1$ and $\delta_2$ between the target land area ZC selected and the optical sensor CO in accordance with the relationships (9), as a function of the data associated with the two matched images including the target land area, such as the positions $\vec{p}_O$ and $\vec{p}_R$ of the satellites and hence, the sensors, the distance $d_R$ between the target area and the radar sensor CR, and the sight direction $\vec{u}_O$ of the optical sensor CO towards the target area ZC. At step E7, the device DL compares each of the solutions of distance $\delta_1$ and $\delta_2$ with the radius RE of the earth and selects the solution which is positive and less than the radius RE of the earth and which constitutes the correct distance $\delta$ between the optical sensor CO and the target area ZC when the image IO was captured.

Finally, the device DI deduces in step Ea the three coordinates of the position vector $\vec{p}_C = \vec{p}_O + \delta \vec{u}_O$ of the target area ZC in the frame of reference OXYZ and in particular its elevation as a function of the distance $\delta$, in accordance with equation (5). The correct distance $\delta$ and the position $\vec{p}_C$ are determined directly according to the invention, without using a digital elevation model DEM.

The invention described herein relates to a method, a system and a device for locating a target land area three-dimensionally. According to one implementation, the steps of the method of the invention are determined by the instructions of a computer program which is incorporated into the device. The computer program, which can be implemented in the locating device of the invention, comprises program instructions which, when said program is executed in the device, the operation of which is then controlled by the execution of the program, compare images, match images and determine the distance between a target area and an optical sensor in accordance with the method of the invention.

The invention consequently also applies to a computer program, in particular a computer program recorded on or in a computer-readable recording medium, and any data-processing device which is adapted to implement the invention. This program can use any programming language and be in the form of source code, object code or intermediate code between source code and object code, such as in a partially compiled form, or in any other desired form for implementing the method according to the invention. The program may be downloaded to the device via a communication network, such as the internet.

The recording medium may be any entity or device capable of storing the program. For example, the medium may comprise a storage means on which the computer program according to the invention is stored, such as a ROM, for example a CD ROM or a microelectronic circuit ROM, or else a USB stick or a magnetic recording means, for example a floppy disk or a hard disk.

The invention claimed is:

1. A method run on a processor for locating a target land area (ZC) three-dimensionally by means of an optical sensor (CO) and a radar sensor (CR) carried respectively in satellites (STO, STR), comprising measuring the positions ($\vec{p}_{IO}$, $\vec{p}_{IR}$) of the satellites when the sensors point at land areas, wherein it comprises measuring a sight direction ($\vec{u}_{IO}$) of the optical sensor and capturing an image (IO) of a land area ($ZT_{IO}$) for each of the measured positions ($\vec{p}_{IO}$) of the optical sensor (CO), measuring the distance ($d_{IR}$) between a land area ($ZT_{IR}$) and the radar sensor (CR) and capturing an image (IR) of the land area ($ZT_{IR}$) for each of the measured positions ($\vec{p}_{IR}$) of the radar sensor (CR), comparing the images (IO) captured by the optical sensor (CO) and the images (IR) captured by the radar sensor (CR), matching the images (IO, IR) of land areas ($ZT_{IO}$, $ZT_{IR}$) captured by the optical and radar sensors and covering common land areas, and determining the distance ($\delta$) between the target land area selected from the common land areas and the optical sensor as a function of the positions ($\vec{p}_O$, $\vec{p}_R$) of the sensors, the distance ($d_R$) between the target land area and the radar sensor, and the sight direction ($\vec{u}_O$) of the optical sensor, which are associated with the images captured by the optical and radar sensors covering the target land area.

2. The method as claimed in claim 1, wherein determining the distance ($\delta$) between the target land area (ZC) and the optical sensor (CO) comprises solving a quadratic equation of the distance ($\delta$) between the target land area and the optical sensor dependent on the positions ($\vec{p}_O$, $\vec{p}_R$) of the satellites, the distance ($d_R$) between the target land area and the radar sensor, and the sight direction ($\vec{u}_O$) of the optical sensor toward the target land area to give two solutions of distance, and selecting the one of the two solutions of distance which is less than the radius of the earth.

3. The method as claimed in claim 1, wherein determining the distance ($\delta$) between the target land area (ZC) and the optical sensor (CO) comprises determining the following two solutions of distance:

$$\delta = \vec{u}_O^T(\vec{p}_R - \vec{p}_O) \pm ([\vec{u}_O^T(\vec{p}_R - \vec{p}_O)]^2 - |\vec{p}_R - \vec{p}_O|^2 + d_R^2)^{1/2},$$

in which $\vec{p}_O$ and $\vec{p}_R$ denote the positions of the satellites (STO, STR) carrying the optical sensor (CO) and the radar sensor (CR), $d_R$ denotes the distance between the target land area and the radar sensor and $\vec{u}_O$ denotes the sight direction of the optical sensor towards the target land area, and selecting the one of the two solutions of distance which is less than the radius of the earth.

4. A system for locating a target land area (ZC) three-dimensionally, comprising an optical sensor (CO) and a radar sensor (CR) carried respectively in satellites (STO, STR), a means (STO) for measuring positions ($\vec{p}_{IO}$) of the satellite (STO) carrying the optical sensor when the optical sensor is capable of pointing at land areas, and a means (STR) for measuring positions ($\vec{p}_{IR}$) of the satellite (STR) embedding the radar sensor when the radar sensor is capable of pointing at land areas, wherein it comprises a means (CO) for measuring a sight direction ($\vec{u}_{IO}$) of the optical sensor and capturing an image (IO) of a land area ($ZT_{IO}$) for each of the measured positions ($\vec{p}_{IO}$) of the optical sensor (CO), a means (CR) for measuring the distance ($d_{IR}$) between a land area ($ZT_{IR}$) and the radar sensor and capturing an image (IR) of the land area ($ZT_{IR}$) for each of the measured positions ($\vec{p}_{IR}$) of the radar sensor, a means (DL) for comparing images (IO) captured by the optical sensor (CO) and images (IR) captured by the radar sensor (CR), a means (DL) for matching images (IO, IR) of land areas ($ZT_{IO}$, $ZT_{IR}$) captured by the optical and radar sensors and covering common land areas, and a means (DL) for determining the distance ($\delta$) between the target land area selected from the common land areas and the optical sensor as a function of the positions of the sensors, the distance between the target land area and the radar sensor, and the sight direction of the optical sensor, which are associated with the images captured by the optical and radar sensors covering the target land area.

5. A device (DL) capable of receiving measured positions ($\vec{p}_{IO}$, $\vec{p}_{IR}$) of satellites (STO, STR) when an optical sensor (CO) and a radar sensor (CR) carried respectively in the satellites (STO, STR) are capable of pointing at land areas, for locating a target land area (ZC) three-dimensionally, wherein it comprises a means (CA) for comparing images (IO) of land areas ($ZT_{IO}$) captured by the optical sensor (CO) and associated with measured positions ($\vec{p}_{IO}$) and measured sight directions ($\vec{u}_{IO}$) of the optical sensor (CO) and images (IR) of land areas ($ZT_{IR}$) captured by the radar sensor (CR) and associated with measured positions ($\vec{p}_{IR}$) of the radar sensor (CR) and with measured distances ($d_R$) from the radar sensor, a means (CA) for matching images (IO, IR) of land areas ($ZT_{IO}$, $ZT_{IR}$) captured by the optical and radar sensors and covering common land areas, and a means (CA) for determining the distance ($\delta$) between the target land area selected from the common land areas and the optical sensor as a function of the positions ($\vec{p}_O$, $\vec{p}_R$) of the sensors, the distance ($d_R$) between the target land area and the radar sensor, and the sight direction ($\vec{u}_O$) of the optical sensor, which are associated with the images captured by the optical and radar sensors covering the target land area.

6. A computer program capable of being implemented in a device (DL) capable of receiving measured positions ($\vec{p}_{IO}$, $\vec{p}_{IR}$) of satellites (STO, STR) when an optical sensor (CO) and a radar sensor (CR) embedded respectively on the satellites (STO, STR) are capable of pointing at land areas, for locating a target land area (ZC) three-dimensionally, wherein said program comprises instructions which, when the program is executed in said device, carry out the steps of comparing images, matching images and determining distance as claimed in claim 1.

* * * * *